US009514039B2

(12) United States Patent
Jaquet

(10) Patent No.: US 9,514,039 B2
(45) Date of Patent: Dec. 6, 2016

(54) DETERMINING A METRIC CONSIDERING UNALLOCATED VIRTUAL STORAGE SPACE AND REMAINING PHYSICAL STORAGE SPACE TO USE TO DETERMINE WHETHER TO GENERATE A LOW SPACE ALERT

(71) Applicant: International Business Machines corporation, Armonk, NY (US)

(72) Inventor: Stefan Jaquet, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 13/767,823

(22) Filed: Feb. 14, 2013

(65) Prior Publication Data

US 2014/0229701 A1    Aug. 14, 2014

(51) Int. Cl.
*G06F 12/08* (2016.01)
*G06F 12/02* (2006.01)
*G06F 3/06* (2006.01)
*G06F 12/06* (2006.01)

(52) U.S. Cl.
CPC ......... *G06F 12/0238* (2013.01); *G06F 3/0665* (2013.01); *G06F 12/0653* (2013.01); *G06F 12/0246* (2013.01); *G06F 2212/1032* (2013.01); *G06F 2212/7204* (2013.01)

(58) Field of Classification Search
CPC ....................................... G06F 3/0662–3/0667
See application file for complete search history.

(56) References Cited

U.S. PATENT DOCUMENTS

| | | | |
|---|---|---|---|
| 7,536,529 B1 * | 5/2009 | Chatterjee et al. ... | G06F 3/0608 711/111 |
| 2007/0150690 A1 * | 6/2007 | Chen et al. ................... | 711/170 |
| 2007/0277017 A1 * | 11/2007 | Yamane et al. ............... | 711/170 |
| 2009/0144499 A1 * | 6/2009 | Nicholson et al. ........... | 711/118 |
| 2011/0016287 A1 | 1/2011 | Acedo et al. | |
| 2011/0099321 A1 * | 4/2011 | Haines et al. ................ | 711/103 |
| 2012/0030404 A1 | 2/2012 | Yamamoto et al. | |
| 2012/0173838 A1 | 7/2012 | Noll et al. | |
| 2013/0311989 A1 * | 11/2013 | Ota et al. ......................... | 718/1 |

* cited by examiner

*Primary Examiner* — Nicholas Simonetti
(74) *Attorney, Agent, or Firm* — David W. Victor; Konrad, Raynes, Davda and Victor LLP

(57) ABSTRACT

Provided are a method, system, and computer program product for determining a metric to use to determine whether to generate a low space alert. A determination is made of provisioned storage space comprising storage space allocated to at least one application, wherein applications may use less than all the provisioned storage space. A determination is made of available storage space comprising all installed storage space available for use by the at least one application having allocated storage space. A determination is made of allocated storage space comprising storage space used by the applications. A determination is made of an allocation metric as a function of the provisioned storage space, the allocated storage space, and the available storage space. The determined allocation metric is used to determine whether to generate a storage space related alert.

18 Claims, 3 Drawing Sheets

DETERMINING A METRIC CONSIDERING UNALLOCATED VIRTUAL STORAGE SPACE AND REMAINING PHYSICAL STORAGE SPACE TO USE TO DETERMINE WHETHER TO GENERATE A LOW SPACE ALERT

BACKGROUND OF THE INVENTION

1. Field of the Invention

The present invention relates to a method, system, and computer program product for determining a metric to use to determine whether to generate a low space alert.

2. Description of the Related Art

In Storage Area Networks ("SAN"), storage space is hosted on dedicated storage systems and accessed by the consuming applications across a fibre channel network. Storage space in a storage system is divided into storage pools and is provisioned from the pools in the form of volumes which are assigned to the host server(s) running applications. The hosts view the volumes as disks or logical units. In typical deployments, the storage space allocated to a volume is not entirely used by the host applications, but more storage space is used over time. Thin provisioning is a virtualization technology that assigns a large virtual space to a volume that a host views as if the full space is allocated. However not all the space is actually allocated to the volume until needed by the host. Thus, thin provisioning has the appearance of having more physical storage space than actually available, where space is allocated just as needed. With thin provisioning, the virtual storage space of a volume on the storage system is not fully realized at volume-creation time. The necessary physical space is dedicated to the virtual volume only as the applications starts using the space in the volume. Thin provisioning minimizes allocating unused space to volumes in the storage environment because real physical space is allocated to the volume only when actually needed.

Normally, provisioning more storage space than physically available (over provisioning or over allocating) is not problematic because typically not all of the assigned virtual space is used. However as space demands increase, then the storage system may run out of physical space for unallocated virtual space. If this occurs, applications may not receive access to the space they need and may not be able to complete processes, resulting in errors. It is therefore important to effectively monitor thin provisioned space usage in pools and storage systems. Current techniques for such monitoring consider either virtual or physical space.

Monitoring virtual space entails computing the ratio of total assigned virtual storage space to total physical storage system space. For example if the space assigned in all the volumes is 15 TB, but the storage system only has 10 TB of space, this results in a virtual allocation percentage of 150% (or an over-provisioning percentage of 50%). This metric indicates how much space has been promised to applications compared to the space that is actually available in the pool or storage system.

Another technique is to monitor physical space which involves computing the ratio of used volume space to the total pool or storage system space. For example if all the volume space used by virtual storage is 8 TB, and the pool or storage system has 10 TB of total physical space, then there is a usage percentage of 80%, i.e. the pool or storage system is 80% used, or only 20% available. This metric provides an indication of whether the storage system is running out of space, and how quickly it is running out of space. These different metrics may be used to monitor thin provisioned space usage in a storage pool or system.

SUMMARY

Provided are a method, system, and computer program product for determining a metric to use to determine whether to generate a low space alert. A determination is made of provisioned storage space comprising storage space allocated to at least one application, wherein applications may use less than all the provisioned storage space. A determination is made of available storage space comprising all installed storage space available for use by the at least one application having allocated storage space. A determination is made of allocated storage space comprising storage space used by the applications. A determination is made of an allocation metric as a function of the provisioned storage space, the allocated storage space, and the available storage space. The determined allocation metric is used to determine whether to generate a storage space related alert.

DETAILED DESCRIPTION

Figure 1:
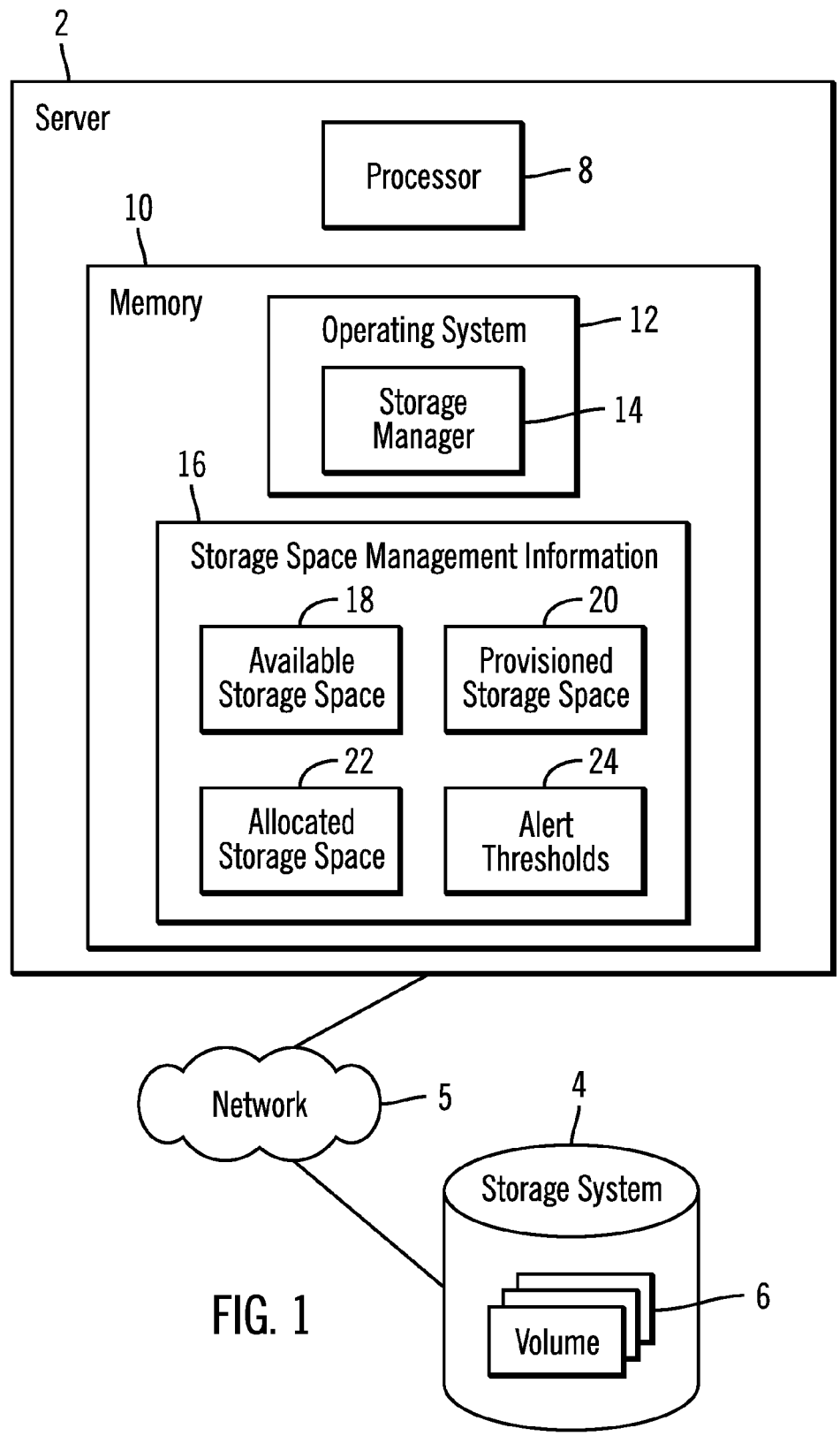
FIG. 1 illustrates an embodiment of a storage environment.

The limitation of the virtual space ratio, which is the ratio of assigned virtual space to available physical space, is that the ratio does not change unless more volumes are created. Thus, as applications use more and more space over time, the virtual space ratio does not indicate the reduced amount of actual available storage space. On the other hand, the limitation of the physical space ratio, which is the ratio of used space to actual available space, is that it does not provide information on whether a critical space shortage is developing based on over-provisioning of storage. If for example only 11 TB of storage space has been assigned of 10 TB available, then even at 80% full (8 TB allocated), the space shortage is not yet acute because there is sufficient physical storage, e.g., 2 TB available for the 3 TB of assigned but not yet allocated space. However if 20 TB of storage space has been assigned of 10 TB available, then at 80% full the space shortage is much more severe because there is now only 2 TB of physical storage space available for 12 TB assigned but not yet allocated.

Described embodiments provide an improved allocation metric that reflects the amount of risk of running out of space for thin-provisioned space in a storage system (or pool). Described embodiments incorporate both virtual as well as physical space considerations, and that shows increasing risk as more and more space gets used by applications over time. Described embodiments provide a metric that considers allocated storage space, physically available storage space, and assigned virtual storage space to determine a realizable allocated storage space as a function of a ratio of remaining free space and remaining unallocated virtual space in the storage system or pool. The unallocated virtual space comprises the amount of virtual space not yet assigned physical storage.

The described realizable allocation metric indicates a percentage of space promised to applications that is still realizable, i.e., that can still be allocated. At 100% or greater, there is no space shortage because no over-provisioning was performed (less space has been promised than what is physically available). But the closer the percentage comes to 0%, the more critical the storage space shortage. At 0% there is no remaining physical space so applications may start to fail. In this way, a single metric allow users to set threshold boundaries that result in more accurate low storage space alerts by taking into account both remaining physical space and remaining unallocated virtual space, i.e., promised allocated space not yet used. This results in a reduction in the number of false positive alerts (when a user is alerted notwithstanding there is sufficient space available) or false negatives (there is no alert even though space is needed). Once alerted, the user or administrator can then take the necessary measures to add more physical space to the storage system (or pool), to mitigate the space shortage.

In further embodiments, an "unrealizable allocation percentage" indicates a percentage of promised space that can no longer be allocated, which is the inverse of the realizable allocation percentage. For an "unrealizable allocation percentage", 0% may indicate no problem, and a 100% may indicate that the system or pool is out of space.

FIG. 1 illustrates a network storage environment having a server 2 managing the storage of data in a storage system 4 or storage pool, which may be configured into one or more storage volumes 6 or other logical devices. The server 2 may connect to the storage system 4 via a network 5. The server 2 includes a processor 8 comprising one or more processor devices and a memory 10 in which an operating system 12 is loaded to be executed by the processor 8. The operating system 12 includes a storage manager 14 to manage the storage system 4.

The storage manager 14 maintains storage space management information 16 including available storage space 18 comprising all the available storage space in the storage system 4; provisioned storage space 20 comprising space assigned to volumes 6 for applications (not shown), where applications may not use all the provisioned space; allocated storage space 22 used by the applications from the provisioned storage space 20; and alert thresholds 24 used to determine when to generate a storage space alert.

The storage manager 14 manages the provisioning and allocation of storage volumes 6 in the storage system 4 to applications (not shown). The applications may be located on the server 2 or on remote hosts connected to the server 2 over the network 5. The storage manager 14 may provide storage services to remote host as part of an enterprise computing environment or as part of a cloud computing model where cloud storage space is provisioned to users over the network 5. The storage manager 14 may provision a storage volume 6, or may provision and allocate storage across smaller subdivisions of the storage system 4, including storage pools and other units of storage. In addition, the storage manager 14 may monitor usage of storage space across the whole system. The storage manager 14 may further provision and allocate storage across smaller subdivisions of the storage system 4, including storage pools and other units of storage.

The network 5 may comprise a network such as a Local Area Network (LAN), Storage Area Network (SAN), Wide Area Network (WAN), the Internet, a peer-to-peer network, wireless network, etc.

The storage system 4 may be implemented in different types or classes of storage devices, such as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The storage devices implementing the storage system 4 and storage volumes 6 may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors.

The memory 10 may comprise one or more volatile or non-volatile memory devices. The storage manager 14 may be implemented as a program that is part of the operating system 12 and executed within the memory 10. Alternatively, the storage manager 14 may be implemented as application code external to the operating system 12 or may be implemented with hardware logic, such as an Application Specific Integrated Circuit (ASIC), or as a programmable processor executing code in a computer readable storage medium.

Figure 2:
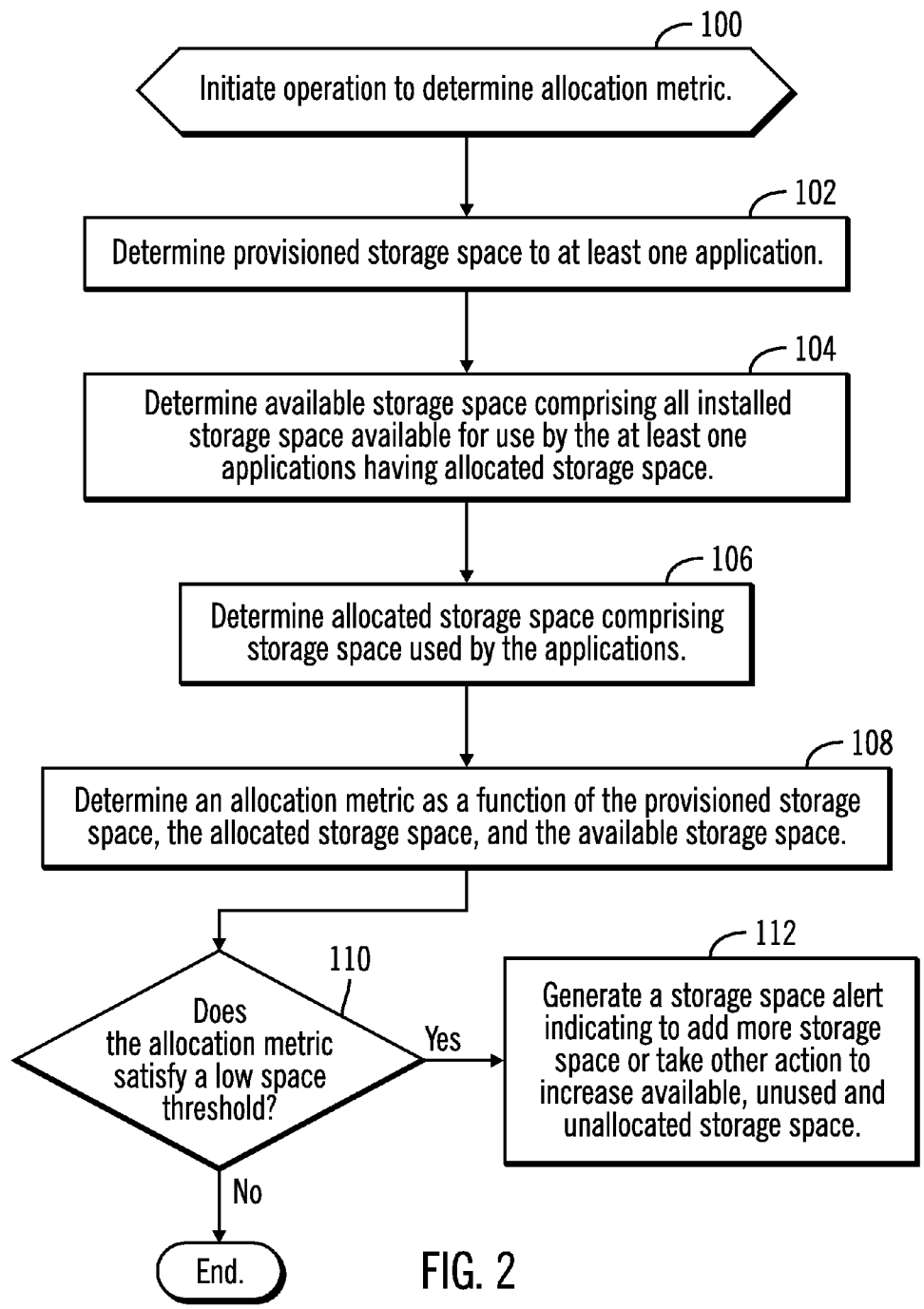
FIGS. 2 and 3 illustrate embodiments of operations to compute and use an allocation metric to determine when to generate a low space alert.

FIG. 2 illustrates an embodiment of operations performed by the storage manager 14 to determine an allocation metric used with the alert thresholds 24 to determine whether to generate a storage space alert requesting an administrator to add additional storage space. Upon initiating (at block 100) the operation to determine the allocation metric, the storage manager 14 determines (at block 102) provisioned storage space 20 promised to applications, i.e., virtual storage space. The storage manager 14 determines (at block 104) available storage space 18 in the storage system 4 available for use by the applications. The storage manager 14 also determines allocated storage space 22 comprising provisioned storage space 20 being used by the applications. The provisioned storage space 20 may exceed the actual physical available storage space 18, resulting in unallocated virtual storage. Physical storage space may be allocated to the unallocated virtual storage space when needed.

The storage manager 14 determines (at block 108) an allocation metric as a function of the allocated storage space 22, the provisioned storage space 20, and the available storage space 18. If (at block 110) the allocation metric satisfies a low space threshold of the thresholds 24, then the storage manager 14 generates (at block 112) a storage space alert indicating to add more storage space or take other action to increase available, unused storage space. Depending on the metric used, the low space threshold 24 may be satisfied by exceeding or falling below the metric.

With the described embodiments, the allocation metric considers the available storage space 18, the provisioned storage space 20, and the actual allocated storage space 22 to determine the risk factor of running out of storage space, thus combining both physical space and virtual space attributes into a single metric.

Figure 3:
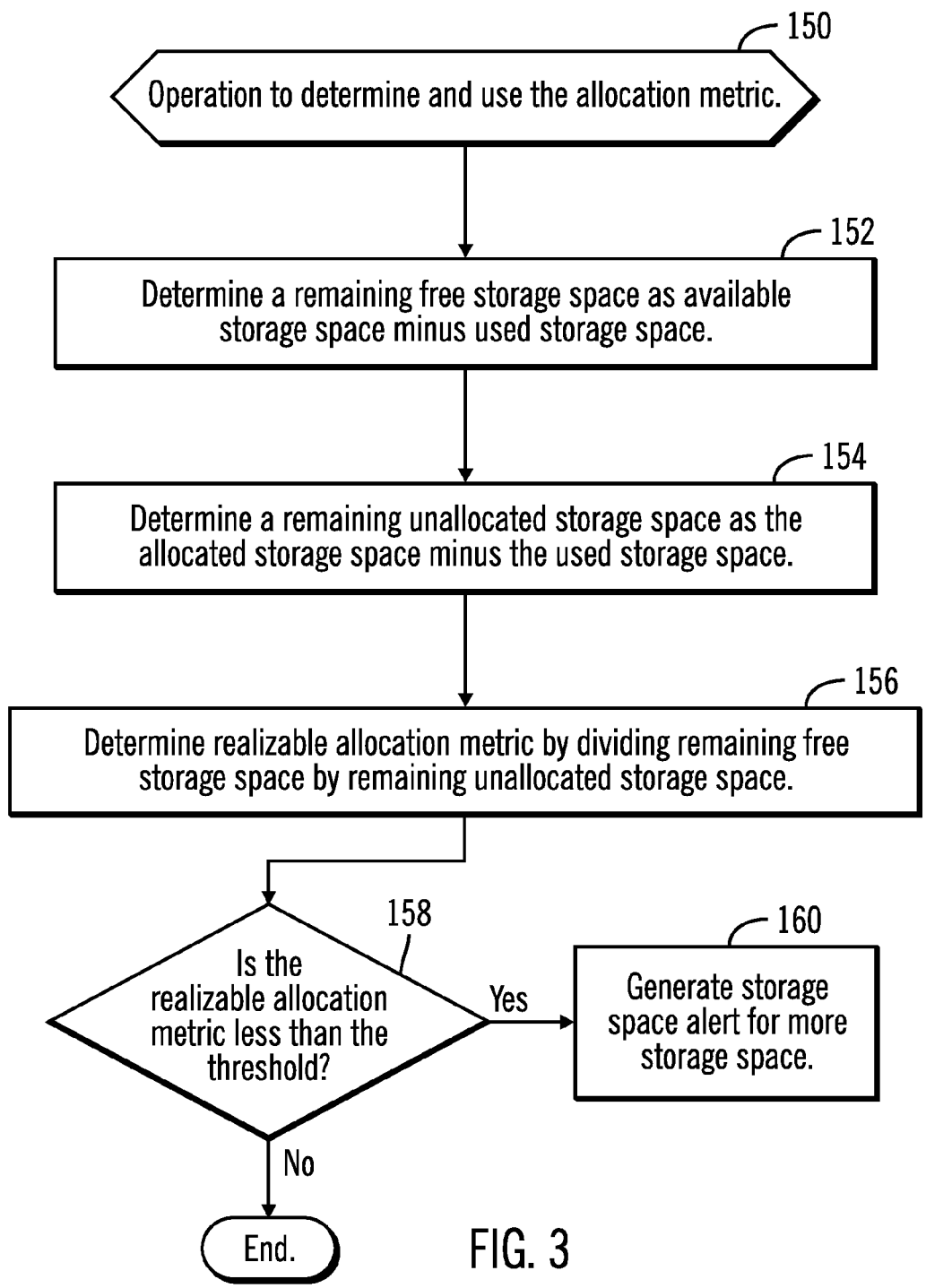

FIG. 3 illustrates an embodiment of operations the storage manager 14 may perform to determine and use the allocation metric. Upon initiating (at block 150) the operation to determine and use the allocation metric, the storage manager 14 determines (at block 152) a remaining free storage space as available storage space 18 minus allocated storage space 22 and determines (at block 154) a remaining unallocated storage space as the provisioned storage space 20 minus the allocated storage space 22. The storage manager 14 then determines (at block 156) a realizable allocation metric by dividing the remaining free storage space by the remaining unallocated storage space. If (at block 158) the realizable allocation metric is less than the threshold, then the storage space alert is generated (at block 160) for the storage system or storage pool 4. Otherwise, if the realizable allocation metric is not less than the threshold, then control ends.

By way of example, if the total storage space is 10 TB and 6 TB has been allocated, then the remaining free storage space is 10 TB minus 6 TB, or 4 TB. If the provisioned storage space is 12 TB, then the remaining unallocated storage space is 12 TB minus 6 TB, which equals 6 TB. The realizable allocation metric may then comprise 4 TB (remaining free storage space) divided by 6 TB (the remaining unallocated storage space), which equals ⅔. In other words there is 4 TB of storage space available for 6 TB of provisioned, but unallocated storage space.

The realizable allocation metric takes into account the amount of provisioned virtual space promised to applications and the amount of physical space realizable or available, i.e., unallocated. In this way, the metric is a realizable allocation percentage indicating how much of the virtual storage space provisioned but not yet allocated is still physically possible to allocate in the storage system 4 or pool.

With the realizable allocation percentage, a higher value indicates that there is less potential risk of space shortage and a lower value indicates a greater risk that available physical space may not be able to satisfy the unallocated virtual space. If there is not sufficient physical storage space to allocate to virtual space when needed, then the applications may have to shut down if they cannot access the space that is needed for operations. A realizable allocation percentage greater than 100% indicates that there is more physical storage space available than the amount of allocated space not yet used, i.e., unallocated virtual storage. A value less than 100% indicates that there is not enough physical storage space to accommodate all the unallocated virtual storage space. A value of 0% indicates that the physical storage space has been completely exhausted. At some point the realizable allocation percentage may be deemed sufficiently low and risky to warrant throwing a storage space alert to notify the administrator to add storage to the storage system 4.

In an alternative embodiment, the allocation metric may comprise an unrealizable allocation percentage computed by dividing the amount of physical space that can no longer be allocated by the remaining unallocated storage space. For instance, the unrealizable allocation percentage formally may comprise 100% minus the realizable allocation percentage, or (remaining_unallocated_virtual_space_remaining_free_space) divided by (remaining_unallocated_virtual_space). Further, a value less than 0% may be treated as zero. In this way, if remaining_free_space is greater than remaining_unallocated_virtual_space, then a negative value is not used in the numerator.

With the unrealizable allocation percentage, a value less than zero indicates that there is more remaining storage space than the unallocated virtual storage space, whereas a value greater than zero indicates that there is not enough physical available storage space to for that promised, but not yet used, i.e., unallocated virtual storage. A value of 100% indicates that the physical storage space has been completely exhausted. The threshold may be set such that a low space alert is thrown if the unrealizable allocation percentage is greater than the threshold.

By way of the above example, the unrealizable allocation percentage would comprise 100 percent minus the realizable allocation percentage of ⅔, which equals ⅓. If however in the above example the amount of available storage space is 20 TB and 6 TB 10 has been allocated of 12 TB provisioned, then the unrealizable allocation percentage is (6 TB-14 TB) divided by 6 TB, which would comprise a negative number, and thus would be treated as zero.

Described embodiments provide techniques for determining an allocation metric based on used storage space, allocated storage space, and available storage space to use to determine whether a low space threshold is satisfied such that an alert needs to be thrown to add more storage space. In this way, described embodiments take into account the remaining amount of physical storage space and unallocated virtual space in a single metric that may be used to determine when to throw a low space alert.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the Figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing storage space in a storage system, the computer program product comprising a non-transitory computer readable storage medium having computer readable program code embodied therein that executes to perform operations, the operations comprising:
   determining provisioned storage space comprising storage space assigned to at least one application, wherein the at least one application may use less than all the provisioned storage space;
   determining available storage space comprising total installed physically available storage space in the storage system available to be allocated to unallocated provisioned storage space when needed for use by the at least one application having allocated storage space;
   determining allocated storage space comprising storage space used by the at least one application from the provisioned storage space;

using the available storage space and the allocated storage space to determine a remaining free storage space;

using the provisioned storage space and the allocated storage space to determine a remaining unallocated storage space;

determining an allocation metric as a function of both the remaining unallocated storage space exceeding the remaining free storage space and the remaining unallocated storage space; and using the determined allocation metric to determine whether to generate a storage space related alert.

2. The computer program product of claim 1, wherein the determined remaining free storage space comprises the available storage space minus the allocated storage space.

3. The computer program product of claim 1, wherein the remaining unallocated storage space comprises the provisioned storage space minus the allocated storage space.

4. The computer program product of claim 1, wherein using the determined allocation metric to determine whether to generate a storage space alert comprises:

determining whether the allocation metric is less than a threshold, wherein the threshold is less than one and greater than zero, wherein the storage space alert is generated in response to determining that the allocation metric is less than the threshold.

5. The computer program product of claim 1, wherein the function divides the remaining unallocated storage space exceeding the remaining free storage space by the remaining unallocated storage space to determine the allocation metric.

6. The computer program product of claim 5, wherein using the determined allocation metric to determine whether to generate a storage space alert comprises:

determining whether the allocation metric satisfies a threshold, wherein the storage space alert is generated in response to determining that the allocation metric is greater than the threshold.

7. A system for managing storage space in a storage system, comprising:

a processor; and a computer readable storage medium having code executed by the processor to perform operations, the operations comprising:

determining provisioned storage space comprising storage space assigned to at least one application, wherein the at least one application may use less than all the provisioned storage space;

determining available storage space comprising total installed physically available storage space in the storage system available to be allocated to unallocated of the provisioned storage space when needed for use by the at least one application allocated the provisioned storage space;

determining allocated storage space comprising storage space used by the at least one application from the provisioned storage space;

using the available storage space and the allocated storage space to determine a remaining free storage space;

using the provisioned storage space and the allocated storage space to determine a remaining unallocated storage space;

determining an allocation metric as a function of both the remaining unallocated storage space exceeding the remaining free storage space and the remaining unallocated storage space; and using the determined allocation metric to determine whether to generate a storage space related alert.

8. The system of claim 7, wherein the determined remaining free storage space comprises the available storage space minus the allocated storage space.

9. The system of claim 7, wherein the remaining unallocated storage space comprises the provisioned storage space minus the allocated storage space.

10. The system of claim 7, wherein using the determined allocation metric to determine whether to generate a storage space alert comprises:

determining whether the allocation metric is less than a threshold, wherein the threshold is less than one and greater than zero, wherein the storage space alert is generated in response to determining that the allocation metric is less than the threshold.

11. The system of claim 7, wherein the function divides the remaining unallocated storage space exceeding the remaining free storage space by the remaining unallocated storage space to determine the allocation metric.

12. The system of claim 11, wherein using the determined allocation metric to determine whether to generate a storage space alert comprises:

determining whether the allocation metric satisfies a threshold, wherein the storage space alert is generated in response to determining that the allocation metric is greater than the threshold.

13. A method for managing storage space in a storage system, comprising:

determining provisioned storage space comprising storage space allocated to at least one application, wherein the at least one application may use less than all the provisioned storage space;

determining available storage space comprising total installed physically available storage space in the storage system available to be allocated to unallocated of the provisioned storage space when needed for use by the at least one application having allocated the provisioned storage space;

determining allocated storage space comprising storage space used by the at least one application from the provisioned storage space;

using the available storage space and the allocated storage space to determine a remaining free storage space;

using the provisioned storage space and the allocated storage space to determine a remaining unallocated storage space;

determining an allocation metric as a function of both the remaining unallocated storage space exceeding the remaining free storage space and the remaining unallocated storage space; and using the determined allocation metric to determine whether to generate a storage space related alert.

14. The method of claim 13, wherein the determined remaining free storage space comprises the available storage space minus the allocated storage space.

15. The method of claim 13, wherein the remaining unallocated storage space comprises the provisioned storage space minus the allocated storage space.

16. The method of claim 13, wherein using the determined allocation metric to determine whether to generate a storage space alert comprises:

determining whether the allocation metric is less than a threshold, wherein the threshold is less than one and greater than zero, wherein the storage space alert is generated in response to determining that the allocation metric is less than the threshold.

17. The method of claim 13, wherein the function divides the remaining unallocated storage space exceeding the remaining free storage space by the remaining unallocated storage space to determine the allocation metric.

18. The method of claim 17, wherein using the determined allocation metric to determine whether to generate a storage space alert comprises:

determining whether the allocation metric satisfies a threshold, wherein the storage space alert is generated in response to determining that the allocation metric is greater than the threshold.

* * * * *